(12) United States Patent
Duchet et al.

(10) Patent No.: US 7,246,862 B2
(45) Date of Patent: Jul. 24, 2007

(54) COMPRESSED AIR TREATMENT DEVICE THAT IS DESIGNED TO BE INSTALLED IN AN INDUSTRIAL VEHICLE

(75) Inventors: Bruno Duchet, Mions (FR); Armando Carneiro Esteves, Caluire (FR)

(73) Assignee: Renault V.I., Saint Priest (FR)

( * ) Notice: Subject to any disclaimer, the term of this patent is extended or adjusted under 35 U.S.C. 154(b) by 0 days.

(21) Appl. No.: 10/757,061

(22) Filed: Jan. 14, 2004

(65) Prior Publication Data

US 2004/0145237 A1 Jul. 29, 2004

Related U.S. Application Data

(63) Continuation of application No. PCT/FR02/02305, filed on Jul. 2, 2002.

(30) Foreign Application Priority Data

Jul. 18, 2001 (FR) .................................. 01 09590

(51) Int. Cl.
*B60T 13/00* (2006.01)

(52) U.S. Cl. ............... 303/6.01; 303/119.2; 303/118.1; 137/115.19; 137/899.4

(58) Field of Classification Search ............... 303/6.01, 303/7, 3, 15, 118.1, 119.2; 137/115.19, 115.23, 137/899.4

See application file for complete search history.

(56) References Cited

U.S. PATENT DOCUMENTS

| | | | |
|---|---|---|---|
| 5,560,591 A | 10/1996 | Trudeau et al. | 267/64.16 |
| 5,678,900 A * | 10/1997 | Blanz | 303/6.01 |
| 6,041,808 A | 3/2000 | Blanz | 137/118.06 |
| 6,089,831 A | 7/2000 | Bruehmann et al. | 417/282 |
| 6,276,761 B1 * | 8/2001 | Beck | 303/9.61 |
| 6,540,308 B1 | 4/2003 | Hilberer | 303/6.01 |

FOREIGN PATENT DOCUMENTS

| | | |
|---|---|---|
| EP | 0689117 | 12/1995 |
| EP | 0831383 | 8/1997 |
| EP | 0816142 | 1/1998 |
| EP | 0864476 | 9/1998 |
| EP | 1004495 | 5/2000 |
| WO | WO 96 34785 | 11/1996 |
| WO | WO 0007863 | 2/2000 |

\* cited by examiner

*Primary Examiner*—Robert A. Siconolfi
(74) *Attorney, Agent, or Firm*—Heslin Rothenberg Farly & Mesiti PC; Jeff Rothenberg, Esq.; Victor A. Cardona, Esq.

(57) ABSTRACT

A compressed air treatment device is designed to be installed in an industrial vehicle consisting of a motor vehicle that can pull a trailer. The device comprises a set of electropneumatic components that are controlled by an electronic command/control unit which is interfaced with a computer communication bus and with various electrical components (sensors, switches, etc.). The device is used in particular to manage the compressed air in terms of supplying the service braking circuit(s). The compressed air treatment device also comprises: a supplementary air outlet which is intended to supply control element(s) for the motor vehicle parking brake system; a set of supplementary electropneumatical components which are associated with the supplementary air outlet; control means which are integrated in the outlet; control means which are integrated in the electronic command/control unit and which can control the supplementary set of electropneumatical components according to the information originating from the computer communication bus and/or various electrical components.

20 Claims, 3 Drawing Sheets

COMPRESSED AIR TREATMENT DEVICE THAT IS DESIGNED TO BE INSTALLED IN AN INDUSTRIAL VEHICLE

A CROSS-REFERENCE TO RELATED APPLICATIONS

This application is a continuation of International Application PCT/FR02/02305 filed on Jul. 2, 2002 and published in French as WO 03/008250 on Jan. 30, 2003, and claims priority of French application No. 01.09590 filed Jul. 18, 2001, the complete contents of which applications is incorporated herein by reference. This application is also related to commonly owned concurrently filed U.S. Application Ser. No.: 10/757,058.

TECHNICAL FIELD

The invention relates to the technical field of electropneumatic components particularly those used in industrial vehicles such as trucks or the like. It relates more specifically to a compressed-air treatment device which combines both the supply of the main braking system or service brake, with the supply of the various other systems that employ compressed air as a source of power.

PRIOR ART

In general, industrial vehicles, particularly trucks, are equipped with a braking system that operates on compressed air. This compressed air is produced by a pneumatic compressor driven by the engine. This compressor delivers compressed air which is stored in an air reservoir intended to supply the service brake circuit. In that way, when the driver operates the brake pedal, the compressed air contained in the reservoir concerned supplies the pneumatic circuit thus braking the motor vehicle.

The same arrangement is used for the service braking of the trailer, when the latter is connected to the motor vehicle. An additional reservoir, dedicated to the trailer service braking circuit is also supplied via the compressor.

More specifically, the compressed air produced by the compressor and bound for the reservoirs is routed via an electropneumatic device. This device, connected to the outlet of the compressor, treats the air thus produced to deliver it in an optimum way to the reservoirs connected to the service braking circuit.

This treatment device also delivers compressed air bound for other systems carrying out various functions within the vehicle.

Mention may in particular be made of the parking brake system, which allows the vehicle to be immobilized when it is at rest, by mechanically locking the wheels. This parking brake is released by an actuator when the latter is supplied with compressed air at an appropriate pressure. On existing vehicles, the air treatment device situated at the outlet side of the pneumatic compressor therefore delivers a supply pressure which is conveyed, via dedicated lines, up near to the actuators used to release the parking brake.

More specifically, these lines supply pneumatic components, such as cocks and valves in particular, which deliver a suitable pressure to the actuator. These cocks are generally operated manually by the driver.

Hence, the air treatment device situated on the outlet side of the compressor has an air outlet dedicated to supplying the parking brake circuit of the motor vehicle.

Examples of such treatment devices are described in particular in documents EP 0 689 117, EP 1 004 495, WO 96/34785, EP 0 831 383, EP 0 864 476 and WO 00/07863.

Such devices also comprise supplementary compressed-air outlets intended to supply other systems operating on compressed air.

Mention may for example be made of the pneumatic suspension devices for the axles. For this, the air treatment device situated on the outlet side of the compressor comprises an air outlet which supplies a set of electrically operated valves arranged near the pneumatically suspended axles. These electrically operated valves are operated on the basis of information from sensors situated near the suspended axle.

An altitude sensor measures the difference in height between the chassis of the vehicle and the axle concerned. This sensor delivers information which is processed in order to operate the electrically operated valves that supply the pneumatic suspension cushions, on the basis of the pressure delivered by the air treatment device connected to the compressor.

The same arrangement is also used for managing the parking brake mounted on the trailer.

The same kind of architecture is also used for various other auxiliary equipment items, among which particular mention may be made of the movement take-offs, or alternatively the differential lock systems.

It will be appreciated that the existing architectures have the disadvantage of a localized installation of the various components used for each of the functions described hereinabove. The dispersion of these various components and the proliferation of the pneumatic connections, particularly for connection with the chassis and the cab of the motor vehicle, generate numerous risks of leakage and of improper contacts, together with problems of installation and of maintenance.

One of the problems that the invention proposes to solve is that of the complexity of the pneumatic circuit and its control circuit.

SUMMARY OF THE INVENTION

The invention therefore relates to a device for treating compressed air, intended to be installed in an industrial vehicle. Such a vehicle is generally made up of a motor vehicle that is able to haul a trailer. The air treatment device comprises, in the known way:
  an air inlet for air coming from a compressed-air source;
  at least one air outlet connected to a reservoir intended to supply the service brake system;
  a set of electropneumatic components distributing compressed air from the compressed-air source bound for the reservoir or reservoirs;
  an electronic command and control unit, able to operate said set of electropneumatic components, this control unit being connected to a computer communication bus.

According to the invention, this device is characterized in that it also comprises:
  a supplementary air outlet intended to supply the actuator or actuators of the motor vehicle parking brake system;
  a supplementary set of electropneumatic components which are associated with the supplementary air outlet;
  operating means incorporated into the electronic command and control unit, able to operate the supplementary set of electropneumatic components on the basis of information originating from the computer communication bus and/or sensors connected directly to the command and control unit.

In other words, the parking brake is operated directly by the air treatment device situated on the outlet side of the compressor, rather than by a special-purpose functional assembly which would be dispersed to various points on the vehicle. Operation of the parking brake is to be understood as meaning not only the supplying of the actuators with compressed air pressure, but also the taking account of specific information that allows or forbids the release of the parking brake, on the basis of numerous items of information originating in particular from the cab of the vehicle.

Thus, the various electropneumatic components such as the electrically operated valves that supply the parking brake actuator are incorporated into the air treatment device situated on the outlet side of the compressor and are no longer as they were in the prior art, spread throughout the vehicle.

One of the aspects of the invention therefore consists, on the one hand, in grouping together within one and the same air treatment device, the various electropneumatic components responsible for releasing the parking brake and, on the other hand, in incorporating the control logic for these components into the command and control unit.

The reliability of the whole is thus improved because there is no longer any need to convey to various points of the vehicle and especially to the cabin, the pneumatic information for operating the valves responsible for the parking brake function. The maintenance operations are thus made easier, as are the possibilities of carrying out automated diagnostics, using overall management of the command and control unit, which operates this parking brake.

According to another feature of the invention, the supplementary air outlet and the set of associated electropneumatic components, can be arranged in an element attached to the body of the device. In other words, the supplementary air outlet supplying the actuators of the parking brake system is incorporated into a particular segment which is attached by flanges to the main body of the air treatment device. This architectures proves to be particularly advantageous because it allows the air treatment device to be built up in a modular way, with the possibility in particular of replacing only this segment when it becomes defective, or alternatively of fitting onto a common body various segments configured to supply various types of actuator in the parking brake system.

According to another feature of the invention, the air treatment device may also be designed to operate a pneumatic suspension system. In this case, the air treatment device also comprises:

at least one supplementary air outlet intended to supply the actuator or actuators of the pneumatic suspension system of one axle;

an additional set of electropneumatic members, which is associated with the supplementary air outlet or outlets;

operating means incorporated into the electronic command and control unit and able to operate the additional set of electropneumatic members on the basis of information originating from the computer communication bus.

In other words, the air treatment device connected to the compressor has electrically operated valves which directly supply the pneumatic suspension cushions by delivering the right pressure and flow rate for optimum operation of each of these cushions.

These electrically operated valves are operated on the basis in particular of information flowing along the computer communication bus and/or originating from sensors dedicated to the function, particularly one or several altitude sensors measuring the difference in height between the chassis of the vehicle and one or several points on the pneumatically suspended axle.

Thus, the altitude information is conveyed from near the axle to the electronic command and control unit. It is the latter that then determines the pressure and flow rate that needs to be sent to the pneumatic suspension cushions and which operates the appropriate electrically operated valves, these valves being incorporated into the air treatment device characteristic of the invention.

In this way, the electropneumatic components involved in managing the-parking brake are gathered together at one single place within the air treatment device connected to the compressor, making maintenance operations easier and bringing uniformity to the command and control logic.

This architecture may be broken down to suit the extremely numerous scenarios as far as pneumatic suspension circuits are concerned. Specifically, the vehicle may have one or several pneumatically suspended axles. On each axle, the various pneumatic cushions may be supplied by the same pressure source or alternatively by two different pressure sources. Added to the cushions that provide pneumatic suspension proper, there may be one or more supplementary cushions used for raising an axle.

Thus, the air treatment device according to the invention has the number of outlets suited to the operation of all the suspension cushions present on the vehicle.

Because all of the controls for the various electropneumatic components are incorporated into one and the same device, the supervision of the pneumatic suspension system as a whole is improved, and diagnostic and maintenance operations are made easier.

According to another feature of the invention, the supplementary air outlet or outlets intended to supply the pneumatic suspension system, and the set of associated pneumatic members, are gathered together into one or several elements attached by flanges to the body of the air treatment device.

It is thus possible to alter the architecture of the air treatment device to suit the layout of the vehicle's pneumatic suspension, by combining one or more modules each of which comprises outlets for supplying the air cushions.

Advantageously, in practice, the air outlets intended for supplying the pneumatic suspension system which are attached to an axle can be grouped together in the same element attached by flanges to the body of the device. In other words, the air treatment device comprises several segments attached to the main body, and each one responsible for supplying the pneumatic suspension cushions of a particular axle.

According to another feature of the invention, the air treatment device may be improved to operate various other systems employing compressed air. In this case, the device then comprises at least one complementary air outlet intended to supply the pneumatic actuator or actuators of an auxiliary system such as, in particular, a differential lock system or alternatively a movement take-off system or any other system requiring the use of pneumatic power.

This device also comprises a complementary set of electropneumatic members which is associated with these complementary air outlets. The operating means incorporated into the electronic command and control unit are able to operate this complementary set of electropneumatic members on the basis of information flowing along the computer communication bus and/or originating from sensors dedicated to the various functions.

According to another feature of the invention, the device may also comprise means for dehumidifying the air originating from the compressed-air source. These dehumidifying means may for example include cartridges that can be removed from the body of the air treatment device.

According to another feature of the invention, the treatment device may also comprise one or several supplementary elements attached to the body of the device. Each of these elements may have one or several electrical contacts able to be incorporated into an electric control circuit.

These relay contacts are operated via the command and control unit on the basis of information from the computer communication bus and/or dedicated sensors. By virtue of these electrical contacts it thus becomes possible to operate electrically operated systems. Mention may be made, by way of example, of the control of a differential lock system, which may be performed electrically, or alternatively the power take-off systems, activation of which may, in some cases, be brought about solely under electrical power.

Mention may also be made of the parking brake systems, the actuators of which are operated electrically, rather than pneumatically. Thus, management of this parking brake, whether it be on the motor vehicle or on the trailer, is performed via the command and control unit mounted on the air treatment device. This command and control unit operates the electrical contacts included within the appropriate module thus allowing the electric actuator of the parking brake to be powered or otherwise.

BRIEF DESCRIPTION OF THE FIGURES

The way of producing the invention and the ensuing advantages will become clearly apparent from the description of the embodiment which follows, given by way of nonlimiting example with support of the appended figures, in which.

EMBODIMENT OF THE INVENTION

As already mentioned, the invention relates to an air treatment device intended to equip industrial vehicles such as trucks in particular.

Figure 1:
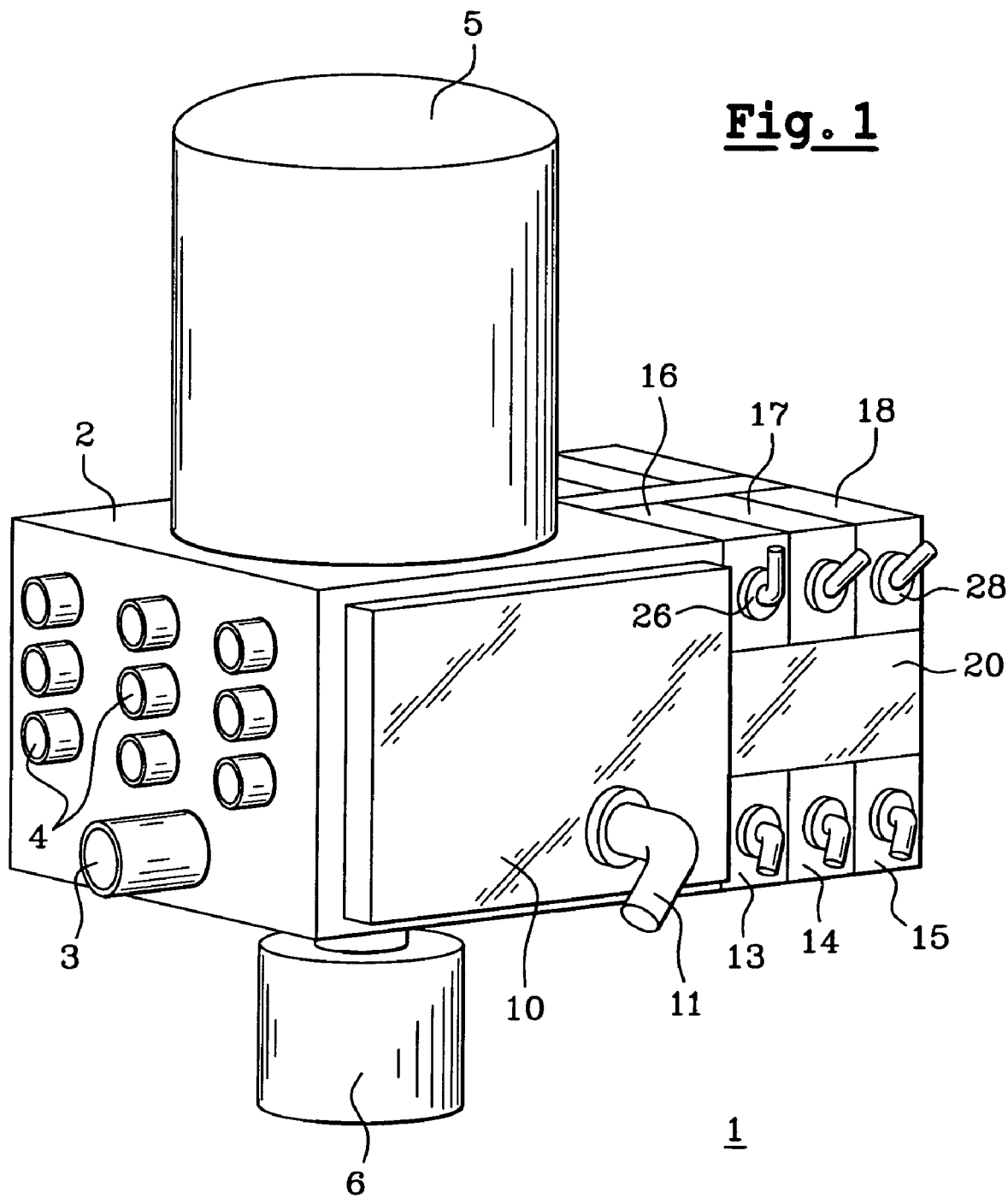
FIG. 1 is an outline perspective view of an air treatment device according to the invention.
Figure 2:
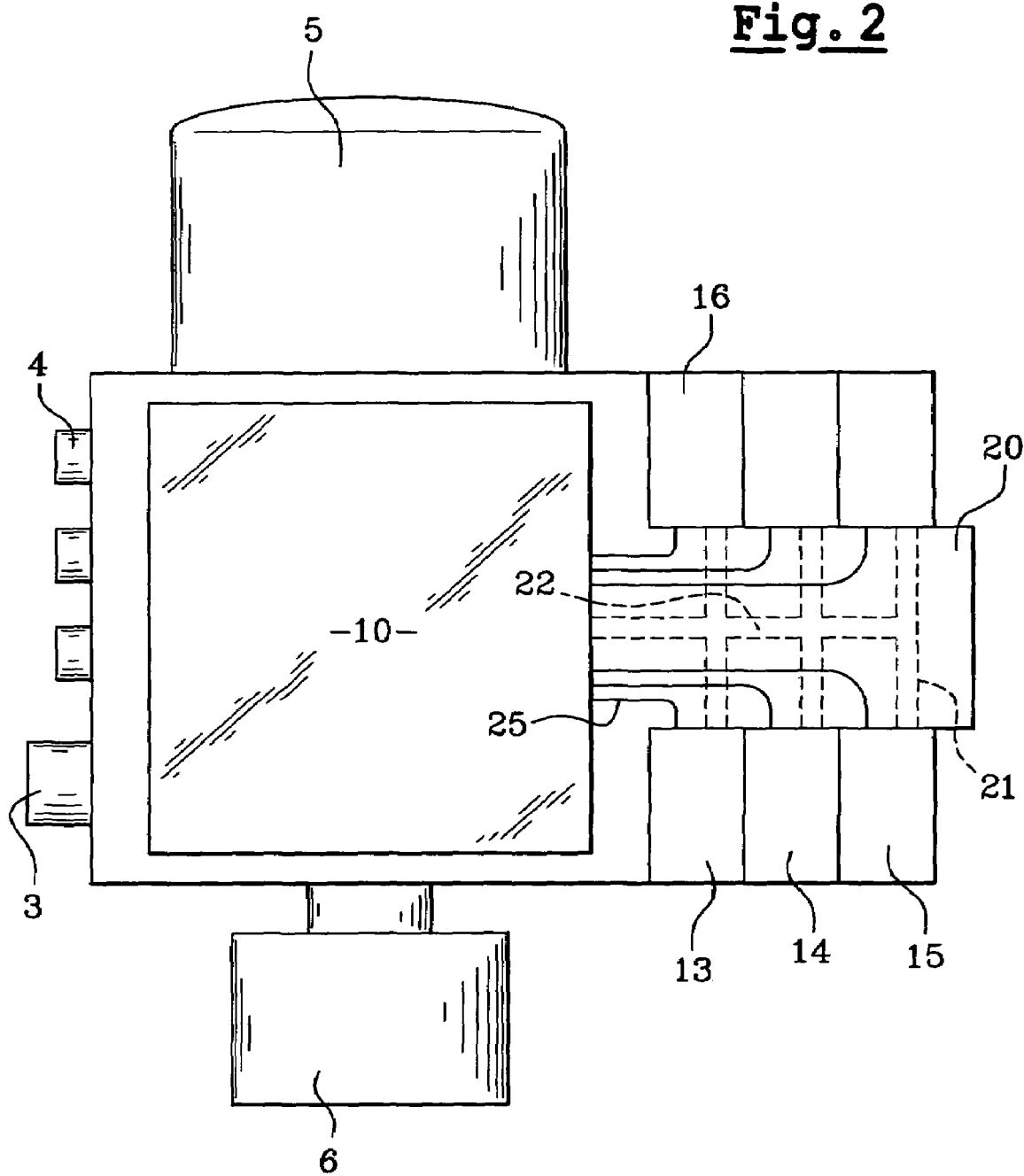
FIG. 2 is a front view of the device of FIG. 1.

In one particular embodiment, this device is in the form illustrated in FIG. 1. Thus, in general, the air treatment device (1) comprises a main body (2) equipped with an air inlet (3) which is intended to be connected to the compressor, itself driven by the engine. The body (2) also comprises a plurality of air outlets (4) intended in particular to supply the front and rear service braking circuits of the motor vehicle, and certain other devices operating on compressed air such as the clutch assistance systems for example, on automatic transmissions.

The number of air outlets (4) illustrated in FIG. 1 is given by way of example, it being understood that the invention covers alternative forms in which the number of outlets is lower or higher than the number illustrated.

The body (2) also accommodates an air dehumidifying cartridge (5) able to remove some of the moisture of the air coming from the compressor. This cartridge (5) may be replaced by other equivalent devices, particularly those employing membranes, and which may possibly be incorporated directly into the body (2) of the air treatment device.

Under its underside, the body (2) has an exhaust silencer (6) that has no particular impact on the essential features of the invention.

On its front face, the body (2) has a command and control unit (10) which, as described later on, operates the various electropneumatic components included within the device. This command and control unit (10) is equipped with a connector (11) which, amongst other things, makes the connection with a computer communication bus allowing communication with various members mounted on the vehicle, particularly the operating and display members present in the cab of the vehicle.

On the opposite side to the air inlet (3), the body of the treatment device comprises a plurality of modules (13-18) which are attached to the body (2) of the device, and more specifically above and below an intermediate portion (20) connected to a lateral face of the body (2). More specifically, these various modules (13-18) may vary in number according to the configuration of the vehicle pneumatic circuit, and according to the number of pneumatic actuators to be supplied.

According to the invention, some of these modules (13-16) include electropneumatic members, and typically electrically operated valves. Certain other ones of these modules (17, 18) are equipped with electromechanical and/or electronic components, typically relays. The supply of compressed air to these various modules (13-16) is via ducts (21, 22) hollowed out inside the intermediate portion (20). These ducts (21, 22) pass along inside the intermediate portion (20) and open out at appropriate points so as to take the corresponding openings made in the pneumatic modules.

When locations likely to accommodate modules are not occupied, these ducts hollowed out in the intermediate portion are then plugged using appropriate members, to prevent any air leaks.

In the same way, the electrical supply to the various modules, particularly the supply to the electrically operated valves and relay controls, is via electrical bundles (25) which are routed along inside the intermediate portion and open onto the faces facing the modules. Suitable connections allow the electrical signals to be carried along inside the modules to operate the electropneumatic, electromechanical or electronic members. These electrical bundles (25) therefore allow the various control signals to be carried from the command and control unit (10) to the various modules (13-18). This bundle may, for example, be produced in the form of a printed circuit incorporated within the intermediate portion (20). Connection members are then fitted in order to connect the tracks of this printed circuit to the upper and lower faces of the intermediate portion.

Each electropneumatic module comprises an air outlet consisting of a pneumatic connector (26) connected to the outlet of the electrically operated valve that is contained in the module (16). In the same way, each electromechanical module comprises an electric connector (28) for leading out the electrical contacts for the relay or relays contained in the electromechanical module (18).

Figure 3:
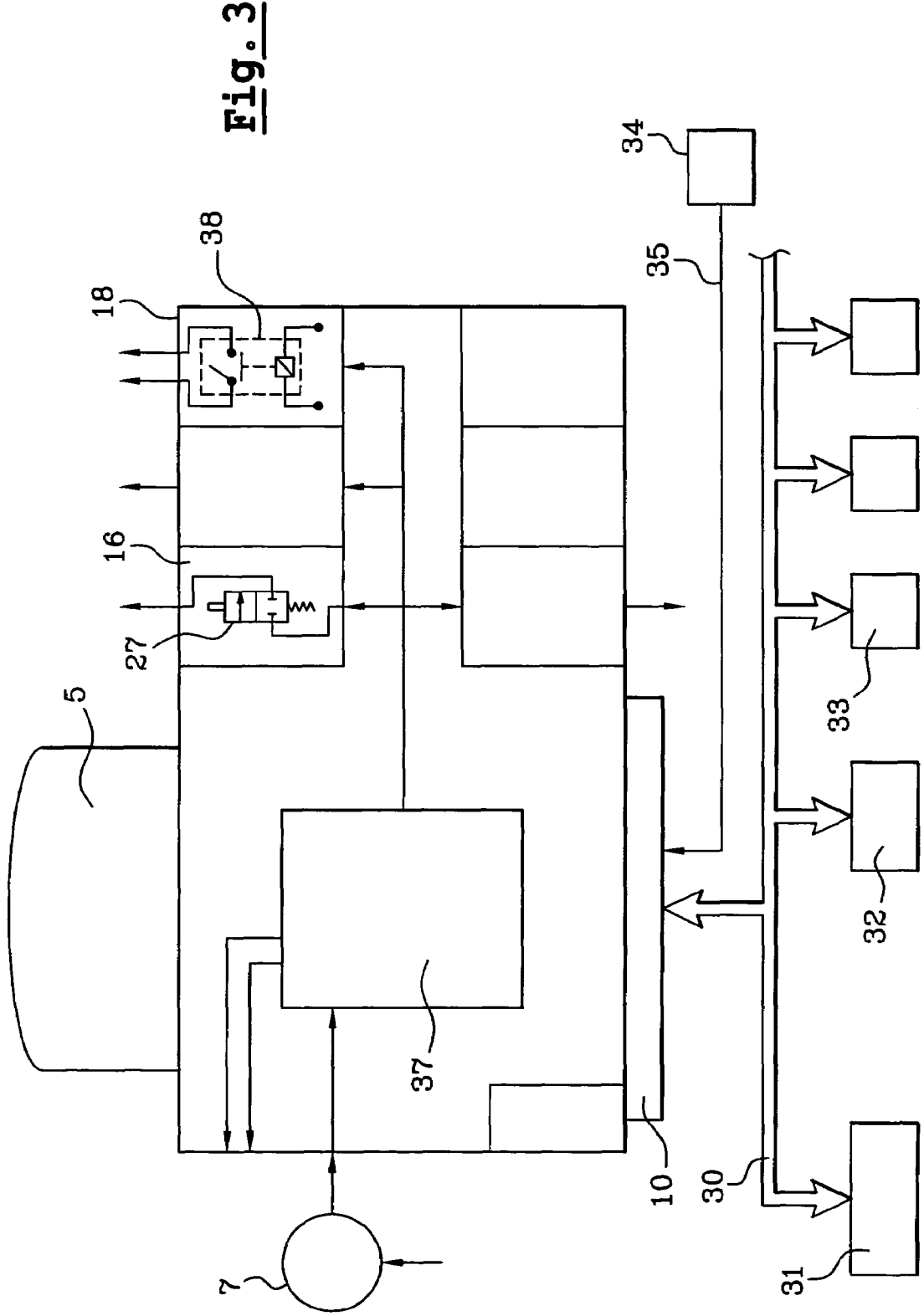
FIG. 3 is a simplified functional diagram showing the overall operation of the device according to the invention.

As illustrated in FIG. 3, the electronic command and control unit (10) is connected via the connector (11) to a computer communication bus (30) with which the vehicle is equipped. This bus (30) may in particular be connected to an electronic unit (31) situated in the cab and itself interfaced with the various switches or potentiometers on which the driver acts, via levers, push-buttons, rotary switches or some other pedal.

This computer communication bus (30) is also connected to the control unit (32) which provides displays on the instrument panel in the cab. This control unit (32) therefore in particular is concerned with displaying the various warning lamps advising of the operating status of the functional members of the vehicle and various failure or configuration messages.

This communication bus (30) may also be interfaced with other members or systems present in the vehicle. It may for example be a device (33) allowing the pneumatic suspension system to be controlled remotely or alternatively various distinct systems of the air treatment device, for sharing with the latter information of the same nature, originating from sensors themselves connected to one of these systems. It may for example concern information about the speed of the road wheels of the vehicle, originating from the sensors connected to the device for electronically regulating the service braking.

More specifically, and with reference to FIG. 3, the heart (37) of the body (2) of the air treatment device comprises known electropneumatic members which will not be described further in detail.

These members generally regulate the pressure delivered by the compressor (7), with possible exhausting when the air consumption is insufficient, or even with interaction with the compressor itself through the opening of its intake and exhaust valves.

These members also distribute the air produced, bound for the reservoirs of the front and rear service braking circuits of the motor vehicle, and for the service braking circuit reservoir of any trailer there might be. This air passes, as soon as it leaves the compressor, through a desiccator the essential part of which is formed by the cartridge (5) illustrated in the figures.

According to the invention, the air treatment device manages the parking brake of the motor vehicle. More specifically, one of the electropneumatic modules (16) is dedicated to supplying the parking brake of the motor vehicle. This module (16) delivers a pressure which acts on an actuator which opposes the application of the parking brake. It is in the presence of this pressure that the parking brake is released. In other words, when this pressure is absent, the parking brake cannot be released. The pressure thus delivered by this module (16) is so by way of an electrically operated valve (27) which is operated on the basis of various information items processed by the command and control unit (10).

Various processing operations on this information may be carried out according to particular safety modes. Thus, the authorization to release the parking brake may be determined on the basis of the command given by the manipulator actuated by the driver, and a measure of the pressure in the service brake circuit reservoir. This pressure check makes it possible to avoid releasing the parking brake when the service brake is not yet operational, because the pressure in the service braking circuit is not yet sufficient. The command and control unit (10) therefore checks these various conditions and governs the electrically operated valve accordingly.

According to another type of parking brake management system, one particularly in force in the countries of Northern Europe, a check is also made to ensure that the driver is present in the cab before authorizing the release of the parking brake. Detection of the presence of the driver can be done in various ways, either by detecting his presence using a sensor present under his seat, or alternatively by detecting actuation by the driver of a particular pedal or lever. It is by combining these various conditions that the electronic command and control unit governs the electrically operated valve of the module that releases the parking brake.

Other functions may also be performed in relation to the parking brake, by virtue of the incorporation of its control into the air treatment device. This may for example be automatic engagement of the parking brake when the driver switches off the ignition in his cab. It is also possible, for example by using a tilt sensor, to make an automatic transition from the service brake to the parking brake when stopping on a hill, also making use of certain information (vehicle speed, etc.) flowing along the computer communication bus.

In certain types of vehicle, it may prove advantageous to use an actuator associated with certain functions, that can be operated electrically. The application of power to this particular actuator may be achieved by way of an electromechanical or electronic module (17, 18) mounted on the air treatment device. In this case, the module may in particular contain a relay (38) a contact of which is inserted in the power circuit for this particular actuator. The appropriate control of this relay (38) powers this circuit, when this application of power is authorized by the electronic command and control unit (10).

According to another feature of the invention, one or several modules (13-18) of the air treatment device are dedicated to the operation of the pneumatic suspension system. In general, the pneumatic suspension systems comprise one (or several) pneumatic cushions which are supplied with appropriate pressures and flow rates, themselves delivered by electrically operated valves. Each electrically operated valve is supplied on the basis of the altitude set point corresponding to the desired distance separating the chassis from the suspended axle. The electrically operated valve is therefore operated on the basis of this set point and of the information originating from the altitude sensor (34) present at the axle concerned. This information may pass along the computer communication bus or, more generally, may pass along a specific wired connection (35). This altitude sensor may also be associated with a sensor indicating the pressure within the pneumatic cushion to allow optimum operation together with complementary functionalities such as measuring the load on the axle.

The number of modules dedicated to supplying the suspension system may vary, according to the suspension architecture chosen. Thus, depending on whether the axle is situated at the trailer attachment or whether the axle is situated at some other point, the cushions present on the axle may be supplied either in parallel or independently. The suspension cushions may also be associated with a lifting cushion allowing the axle to be raised and brought closer to the chassis. This reconfiguration may take place on the basis of a comparison between the load measured on each axle and the maximum load authorized per axle. Thus, a pressure sensor arranged at the axle, measuring the load on the axle may be interfaced with the electronic command and control unit (10) and automatically cause the lowering of the raisable axle if this pressure exceeds a predetermined threshold corresponding to the maximum authorized load.

According to the invention, the electropneumatic modules (13-16) may also supply other members generally known as "auxiliaries" and operating on compressed air power. This may relate to devices generally known as "utilities" and which operate with special-purpose devices that require supply of a predetermined pressure and a predetermined flow rate. Mention may for example be made of the assistance systems present in the transmission.

It may also relate to movement take-offs or power take-offs, corresponding to a mechanical output, generally taken off the transmission or taken directly off the engine. The rotational movement may, for example, be converted into hydraulic power to power hydraulic rams of a skip, crane or equivalent system.

Among the auxiliary devices mention may also be made of differential lock systems. Thus, an outlet from an electropneumatic module may act on an actuator which itself acts on an automatic member at the differential considered, which may be a differential between wheels, a differential between axles, or alternatively may be the transfer gearbox.

More generally, this invention may relate to any system of the vehicle that habitually uses pneumatic power (except for the service braking), for example the pneumatic air horns or certain bodywork equipment items.

The use of the electronic command and control unit (10) centralized into the air treatment device (1) according to the invention provides automated control of these various auxiliary functionalities. Mention may for example be made of the function which may require automatic locking up of the differential and which, through appropriate interfacing via the computer communication bus, allows this function to be carried out very simply by virtue of the invention.

It is evident from the foregoing that the air treatment device according to the invention has numerous advantages, particularly:
- an improvement in the reliability and a reduction in the air leaks by reducing the number of components and pneumatic connections used in using the pneumatic power;
- an improvement in safety associated with the possibilities of diagnosing and managing the degraded modes of the pneumatic circuit;
- an improvement in the options for managing the auxiliary functions by virtue of the use of a command and control unit centralized to the air treatment device;
- a reduction in the cost of the system by virtue of the modular architecture of the air treatment device;
- ease of evolution and of customization of this system to suit a different range of vehicles.

The invention claimed is:

1. A unitary device for treating compressed air, to be installed in an industrial vehicle comprising a motor vehicle able to haul a trailer, including:
   an air inlet for air coming from a compressed-air source;
   at least one air outlet connected to a reservoir or reservoirs intended to supply a service brake system;
   a set of electropneumatic components distributing compressed air from the compressed-air source bound for the reservoir or reservoirs;
   an electronic command and control unit, to operate said set of electropneumatic components, the command and control unit being connected to a computer communication bus and to various electrical components;
   a supplementary air outlet for directly providing compressed air at a variable control pressure to an actuator or actuators of a parking brake system of the motor vehicle;
   a supplementary set of electropneumatic components associated with and upstream of the supplementary air outlet which set receives compressed air at a supply pressure and applies the variable control pressure to the compressed air to selectively fully operate the actuator or actuators; and
   operating means incorporated into the electronic command and control unit, to operate the supplementary set of electropneumatic components on the basis of information originating from the computer communication bus and/or from various electrical components, whereby full operation of the actuator or actuators of the parking brake system is directly controlled by the device rather than by a dispersed pressure control component.

2. The device as claimed in claim 1, wherein the supplementary air outlet and the set of associated electropneumatic components, are arranged in an element attached to a body of the device.

3. The device as claimed in claim 1, further comprising
   additional air outlet or outlets for directly supplying compressed air at a variable control pressure to an actuator or actuators of a pneumatic suspension system of one axle;
   an additional set of electropneumatic components associated with and upstream of the additional air outlet or outlets which set receives compressed air at the supply pressure and applies the variable control pressure to the compressed air to selectively fully operate the actuator or actuators of the pneumatic suspension system;
   operating means incorporated into the electronic command and control unit to operate the additional set of electropneumatic components on the basis of information originating from the computer communication bus and/or various electrical components, whereby full operation of the actuator or actuators of the pneumatic suspension system is directly controlled by the device rather than by a dispersed pressure control component.

4. The device as claimed in claim 3, wherein the additional air outlet or outlets and the additional set of associated electropneumatic members, are gathered together into one or more elements attached to a body of the device.

5. The device as claimed in claim 4, wherein the additional air outlets are grouped together into one and the same element attached by flanges to the body of the device.

6. The device as claimed in claim 3, wherein the electronic command and control unit is interfaced with one or several altitude sensors measuring a difference in height between a chassis of the vehicle and one or several points of the axle.

7. The device as claimed in claim 1, further comprising:
   complementary air outlet or outlets for directly supplying compressed air at a variable control pressure to a pneumatic actuator or actuators of an auxiliary system,
   a complementary set of electropneumatic components associated with and upstream of the complementary air outlet or air outlets which set receives compressed air at the supply pressure and applies the variable control pressure to the compressed air to selectively fully operate the pneumatic actuator or actuators,
   operating means incorporated into the electronic command and control unit to operate the complementary set of electropneumatic components on the basis of information originating in particular from the computer communication bus, whereby full operation of the pneumatic actuator or actuators of the auxiliary system is directly controlled by the device rather than by a dispersed pressure control component.

8. The device as claimed in claim 1, further comprising means for dehumidifying air originating from the compressed-air source.

9. The device as claimed in claim 8, wherein the means for dehumidifying the air comprises a cartridge that can be removed from a body of the device.

10. The device as claimed in claim 2, further comprising one or several supplementary elements attached to the body of the device, each element having one or several electrical contacts to be incorporated into an electric control circuit, said contacts being operated by the command and control unit on the basis of information from the computer communication bus and/or various electrical components.

11. The device as claimed in claim 7, wherein said auxiliary system comprises at least one of a differential lock system and a movement take-off system.

12. The device as claimed in claim 1, wherein there is no pressure control component between the supplementary air outlet and the actuator or actuators of the parking brake system.

13. The device as claimed in claim 1, wherein each set of electropneumatic components comprises one or more electropneumatic components.

14. The device as claimed in claim 3, wherein each set of electropneumatic components comprises one or more electropneumatic components.

15. The device as claimed in claim 7, wherein each set of electropneumatic components comprises one or more electropneumatic components.

16. The device as claimed in claim 1, wherein the unitary device is situated on an outlet side of the compressed air source.

17. The unitary device of claim 1 wherein said supplementary set of electropneumatic components comprises an electropneumatic component for exhausting the compressed air to activate the parking brake.

18. A system for controlling a service brake system and a parking brake system comprising the unitary device of claim 1 and further comprising the actuator or actuators of a parking brake system being located downstream of the supplementary air outlet of the unitary device and configured to actuate the parking brake system, the actuator or actuators being separate from the unitary device.

19. A unitary device for treating compressed air, to be installed in an industrial vehicle comprising a motor vehicle able to haul a trailer, including:
  an air inlet for air coming from a compressed-air source;
  at least one air outlet connected to a reservoir or reservoirs intended to supply a service brake system;
  a set of electropneumatic components distributing compressed air from the compressed-air source bound for the reservoir or reservoirs;
  an electronic command and control unit, to operate said set of electropneumatic components, the command and control unit being connected to a computer communication bus and to various electrical components;
  a supplementary air outlet for directly providing compressed air at a variable control pressure to an actuator or actuators of a parking brake system of the motor vehicle;
  a supplementary set of electropneumatic components associated with and upstream of the supplementary air outlet which set receives compressed air at a supply pressure and applies the variable control pressure to the compressed air to selectively fully operate the actuator or actuators;
  operating means incorporated into the electronic command and control unit, to operate the supplementary set of electropneumatic components on the basis of information originating from the computer communication bus and/or from various electrical components, whereby full operation of the actuator or actuators of the parking brake system is directly controlled by the device rather than by a dispersed pressure control component; and
  wherein one of said supplementary set of electropneumatic components comprises an electropneumatic component for exhausting the compressed air to activate the parking brake system.

20. A system for controlling a service brake system and a parking brake system comprising:
  a unitary device for treating compressed air, to be installed in an industrial vehicle comprising a motor vehicle able to haul a trailer, said unitary device comprising:
    an air inlet for air coming from a compressed-air source;
    at least one air outlet connected to a reservoir or reservoirs intended to supply a service brake system;
    a set of electropneumatic components distributing compressed air from the compressed-air source bound for the reservoir or reservoirs;
    an electronic command and control unit, to operate said set of electropneumatic components, the command and control unit being connected to a computer communication bus and to various electrical components;
    a supplementary air outlet for directly providing compressed air at a variable control pressure to an actuator or actuators of a parking brake system of the motor vehicle;
    a supplementary set of electropneumatic components associated with and upstream of the supplementary air outlet which set receives compressed air at a supply pressure and applies the variable control pressure to the compressed air to selectively fully operate the actuator or actuators;
    operating means incorporated into the electronic command and control unit, to operate the supplementary set of electropneumatic components on the basis of information originating from the computer communication bus and/or from various electrical components, whereby full operation of the actuator or actuators of the parking brake system is directly controlled by the device rather than by a dispersed pressure control component; and
  said actuator or actuators being located downstream of said supplementary air outlet, being configured to activate said parking brake system, and being separate from said unitary device.

* * * * *